Patented Apr. 11, 1950

2,504,054

UNITED STATES PATENT OFFICE 2,504,054

PLASTICIZED ACRYLONITRILE-ISOBUTYLENE COPOLYMER

Pliny O. Tawney, Passaic, N. J., assignor to United States Rubber Company, New York, N. Y., a corporation of New Jersey No Drawing. Application November 4, 1947, Serial No. 784,085

4 Claims. (Cl. 260—45.5)

This invention relates to new resinous products and the process of producing them. More particularly, it relates to resinous compositions consisting of the products of reaction of acrylonitrile with ketone-aldehyde condensation products. In a still more specific aspect it relates to the plasticization of a synthetic resin, especially a resinous copolymer of acrylonitrile and isobutylene, with the resinous material formed by reacting acrylonitrile with a ketone-aldehyde condensation product.

I have discovered that water-insoluble resinous materials having useful properties are formed by condensing an aldehyde with a ketone at a temperature ranging from room temperature to 45° C. and preferably in an alkaline medium, removing solvents and residues of reactants from the reaction mixture after substantial completion of the condensation reaction, and reacting the condensation product thus formed with acrylonitrile in the presence of a strongly alkaline catalyst. Depending on the choice of aldehyde and ketone employed, their relative proportions, and the conditions of reaction, the final products exhibit varied properties. They range from viscous liquids to semi-solid gums and are homogeneous and clear in color. These materials are useful as water-insoluble, non-volatile plasticizers for those synthetic resin compositions which are copolymers of acrylonitrile and isobutylene.

A wide variety of ketones and aldehydes may be employed in the preparation of the condensation product, although, because of their greater reactivity, I prefer to use compounds chosen from the lower members of the aliphatic series. The following are typical examples of combinations that give satisfactory condensates: acetone with formaldehyde, methyl ethyl ketone with formaldehyde, methyl isobutyl ketone with formaldehyde, methyl hexyl ketone with formaldehyde, acetophenone with formaldehyde, cyclohexanone with formaldehyde, acetone with acetaldehyde, and acetone with isobutyraldehyde. The preferred combination is that of acetone with formaldehyde.

Other materials and combinations of materials suitable to give the desired condensation products will suggest themselves.

In the preferred practice of my invention I employ a saturated aliphatic ketone having not more than six carbon atoms in each of its alkyl groups, especially those dialkyl ketones wherein one alkyl group is methyl such as acetone, methyl ethyl ketone, methyl n-propyl ketone, methyl isopropyl ketone, methyl n-butyl ketone, methyl isobutyl ketone, methyl amyl ketone, etc. Other dialkyl ketones may be employed such as diethyl ketone, ethyl propyl ketone, etc. Less preferably, I may use saturated alicyclic ketones such as cyclopentanone and cyclohexanone, or aromatic ketones such as acetophenone and benzophenone.

As the aldehyde, I may use any aldehyde capable of condensation with ketones to give a resinous material. I prefer to use the saturated aliphatic aldehydes especially those having not more than six carbon atoms per molecule such as formaldehyde, acetaldehyde, propionaldehyde, n-butyraldehyde, isobutyraldehyde, n-valeraldehyde, isovaleraldehyde, etc. Formaldehyde is most preferred, on the grounds of low-cost, availability and the excellent results obtained therewith.

The relative proportions of ketone and aldehyde may vary within wide limits. Usually a substantial excess, on a molar basis, of aldehyde over ketone is employed. I prefer to use a molar ratio of aldehyde to ketone within the range of from 3:1 to 6:1 and within this range I prefer a ratio of from 4:1 to 4.5:1.

The reaction between the ketone and the aldehyde is conveniently carried out at temperatures varying between room temperature (which may be taken as 20° C.) and 45° C. The reaction time will depend upon the reactivity of the carbonylic materials employed, as well as upon the temperature, but it may be as short as 6 hours and need seldom exceed 100 hours. The reaction medium is usually water. The condensation of the ketone and the aldehyde is conducted in an alkaline medium, such as aqueous alkali metal hydroxide, e. g. sodium or potassium hydroxide, or aqueous alcoholic alkali metal hydroxide. The alkali serves as a condensing agent. The amount of alkali present is usually small say only one to two per cent of the reactants but should be sufficient to maintain the mixture on the alkaline side. If necessary alkali may be added during the reaction to keep the reaction mixture alkaline.

The ketone-aldehyde condensation product is readily isolated from the reaction mixture by heating and reducing the pressure. Water or other solvents and traces of unreacted starting materials are thereby removed and the condensation product is obtained as a clear, viscous, resinous body.

To obtain the materials which are the subject of my invention, this condensation product is reacted with acrylonitrile in the presence of a catalytic amount of a strong base such as an alkali metal hydroxide, e. g. sodium or potassium hydroxide, or a strongly basic quaternary ammonium hydroxide, e. g. trimethyl benzyl ammonium hydroxide, tetramethyl ammonium hydroxide, and the like. The reactants are mixed and the initially exothermic reaction is moderated by cooling. When this phase of the reaction has subsided the reaction is completed by maintaining the mixture at temperatures within the range of 20° C. to 90° C., and more commonly the range of 20° C. to 50° C., for a period of time which may vary from 4 hours to 30 hours or longer.

The amount of the strong base used as a catalyst in the reaction of the ketone-aldehyde condensation product with the acrylonitrile is usually quite small, commonly being of the order of 0.5 to 2% by weight of the reactants. The reaction mixture should be maintained alkaline throughout the reaction by the use of a sufficient amount of the base at the outset or by the addition of base periodically during the reaction as required. The amount will depend somewhat upon the particular base employed and other factors such as the nature and proportions of the reactants. I prefer to use a strongly basic quaternary ammonium hydroxide and have obtained very good results using trimethyl benzyl ammonium hydroxide as the catalyst.

In the preparation of the materials which are the subject of my invention, the ratio of acrylonitrile to the ketone-aldehyde condensate may be varied over a considerable range. Thus, while the preferred ratio is one mole of acrylonitrile to one mole of aldehyde employed in the preparation of the ketone-aldehyde condensate, ratios as low as 0.2 mole of acrylonitrile per mole of aldehyde and as high as 2.0 moles of acrylonitrile per mole of aldehyde result in satisfactory products. In practice, I usually employ between 1.0 and 2.0 moles of acrylonitrile per mole of aldehyde.

The following examples illustrate more fully the method of carrying out my invention.

Example I

An acetone-formaldehyde condensate is prepared by adding a solution of 2.8 grams of sodium hydroxide in 10 ml. of water to a well stirred mixture of 255 grams of a 37% aqueous formaldehyde solution and 40 grams of acetone. The reaction mixture is maintained at 30–35° C. for 3 days to complete the reaction.

Water and residual traces of reactants are removed from 42.3 grams of this reaction mixture by evaporation at 100° C. at 1 mm. pressure. The resulting viscous condensate is mixed with 3 ml. of a 40% aqueous solution of trimethyl benzyl ammonium hydroxide, and 45.0 grams of monomeric acrylonitrile are added slowly thereto during 30 minutes. During the initial exothermic reaction the mixture is stirred and maintained at 30–35° C. by cooling. After this has subsided the reaction is allowed to proceed at room temperature (25° C.) for 6 days. The resulting mixture is diluted with an equal volume of acrylonitrile and washed successively with 1% sulfuric acid, 5% aqueous sodium bicarbonate solution, and finally with water. On evaporation of the solution at 100° C. and 1 mm. pressure to remove diluents, 37 grams of a viscous yellow oil are obtained. This oil is readily soluble in acetone but insoluble in water and carbon tetrachloride. The nitrogen content, 13.80%, corresponds to a composition containing 52.2% of combined acrylonitrile.

Example II

Water and residual traces of reactants are removed from 171.5 grams of the initial acetone-formaldehyde reaction mixture of Example I by evaporation at 30° C. and 1 mm. pressure to yield 73.5 grams of a clear, viscous condensate. This is mixed with 47.5 grams of acrylonitrile and 15.8 mls. of a 40% aqueous solution of trimethyl benzyl ammonium hydroxide. The initial reaction is strongly exothermic and is controlled by cooling to 28–30° C. with vigorous stirring for about 30 minutes. An additional 94.0 grams of acrylonitrile are then added during one hour and the reaction mixture is allowed to stand at 25° C. for 6 days. On purification and isolation as in Example I, there are obtained 183.0 grams of a viscous, yellow oil which is soluble in acetone and chloroform but insoluble in water, benzene, paraffin hydrocarbons and carbon tetrachloride. The nitrogen content of this oil, 16.12%, indicates a composition containing 61.7% of combined acrylonitrile.

Example III

Forty-seven grams of the initial acetone-formaldehyde reaction mixture of Example I are evaporated at 30° C. and 1 mm. pressure to yield 20 grams of a clear, viscous condensate. This is mixed with 45.0 grams of acrylonitrile and 3 mls. of a 40% aqueous solution of trimethyl benzyl ammonium hydroxide. The exothermic reaction is controlled by stirring and cooling to 30–35° C. for one hour, after which the reaction is completed by heating for 6 hours at 80° C. Isolation and purification of the product of reaction are accomplished as in Example I to yield 43.0 grams of a viscous, light-orange oil. The nitrogen content of this oil, 15.60%, corresponds to a composition containing 59.0% of combined acrylonitrile.

Example IV

An acetone-isobutyraldehyde condensate is prepared by adding a solution of 1.25 grams of sodium hydroxide in 5 mls. of water to a well stirred mixture of 28.8 grams of isobutyraldehyde and 5.8 grams of acetone. Five grams of methanol are added to render the solution homogeneous. The reaction mixture is maintained at 30–35° C. for 6 days to complete the reaction. During this time small amounts of a 20% aqueous solution of sodium hydroxide are added, as necessary, to maintain the alkalinity of the mixture.

Water and unreacted starting materials are removed from the above reaction mixture by evaporation at 100° C. at 1 mm. pressure to yield 31.4 grams of a very viscous yellow oil. This oil is mixed with 3 mls. of a 40% aqueous solution of trimethyl benzyl ammonium hydroxide and 40 grams of acrylonitrile are added at such a rate that the temperature is maintained below 45° C. After this initially strongly exothermic reaction, the mixture is allowed to stand for 24 hours. The mixture is then diluted with an equal volume of acrylonitrile, washed successively with 1% sulfuric acid, 5% aqueous sodium bicarbonate and finally with water. On removal of diluents by evaporation at 100° C. and 1 mm. pressure, there are obtained 50.5 grams of a viscous, dark amber oil. This material contains 12.4% of nitrogen, equivalent to 47% of combined acrylonitrile.

Example V

A methyl ethyl ketone-formaldehyde condensation product is prepared by adding a solution of 0.5 gram of sodium hydroxide in 2 mls. of water to a mixture of 14.4 grams of methyl ethyl ketone and 65.0 grams of a 37% solution of formaldehyde. After the initially highly exothermic reaction has subsided, during which the temperature is maintained at less than 40° C. by cooling, the mixture is allowed to stand at a temperature of 30–35° C. for 6 days. During this period small amounts of a 20% aqueous solution of sodium hydroxide are added, as necessary, to maintain the alkalinity of the mixture. It is then heated for an hour on the steam bath and the water and unreacted starting materials are removed by evaporation at 100° C. and 1 mm. pressure. A very viscous, colorless oil, amounting to 39.5 grams, results. This oil is mixed with 4.0 mls. of a 40% aqueous solution of trimethyl benzyl ammonium hydroxide and 80.0 grams of acrylonitrile are added slowly with efficient stirring. During the initial stage of the reaction the reaction mixture is maintained at a temperature below 45° C. It is then allowed to stand at 30-35° C. for 5 days. After purification and concentration as in Example I, there are obtained 67.0 grams of a water insoluble oil, of a pale orange color and of an extremely viscous nature. Its nitrogen content, 14.27%, corresponds to a composition containing 54.0% of combined acrylonitrile.

The materials described in the above examples serve as effective plasticizers for resinous compositions such as those derived from the copolymerization of acrylonitrile and isobutylene. However, the compatibility of the plasticizers with such resins depends on the ratio of aldehyde to ketone in the condensate employed in the preparation of the plasticizer. Thus, if the molar ratio of aldehyde to ketone exceeds six to one the final cyanoethylated product displays a limited degree of compatibility. When a lower molar ratio than this is used, the final product and the resinous material form a homogeneous mass.

The cyanoethylated ketone-aldehyde product of my invention is a clear, homogeneous nonvolatile resinous material ranging in consistency from a viscous liquid to a semi-solid gum. It is insoluble in water, insoluble in the usual hydrocarbon solvents such as paraffin hydrocarbons and aromatic hydrocarbons typified by benzene. It is insoluble in carbon tetrachloride but is soluble in chloroform and in acetone. It has a nitrogen content corresponding to a combined acrylonitrile content of from 45 to 65%. In color it may range from light yellow or light orange to dark amber. If the molar ratio of ketone to aldehyde in the condensate does not exceed 6:1, the cyanoethylated product is compatible with resinous acrylonitrile-isobutylene copolymers, and is a valuable plasticizer for such resinous copolymers.

Resinous copolymers of acrylonitrile and isobutylene have recently been developed and are of great commercial importance. Such resinous copolymers are generally made by aqueous emulsion polymerization of monomers consisting of acrylonitrile and isobutylene and generally have a combined acrylonitrile value ranging from 65% to 85% by weight and correspondingly a combined isobutylene value ranging from 35% to 15%. Often such resinous copolymers have a combined acrylonitrile content of about 70%, say from 69 to 72%, and a combined isobutylene content of about 30%, say correspondingly from 31% to 28%. In many cases, especially where all of the monomeric acrylonitrile and isobutylene are incorporated in the original emulsion to be polymerized, the resulting resinous copolymers have an undesirably high flow temperature, often being above 140° C. ranging upwardly to as high as 150 to 160° C. or even higher. For this and other reasons the plasticization of resinous acrylonitrile-isobutylene copolymers is often very desirable or essential. However it has proved to be a very difficult matter to successfully plasticize such copolymers with the conventional plasticizers for synthetic resinous copolymers. I have found however that resinous acrylonitrile-isobutylene copolymers may be very successfully plasticized with the reaction products of acrylonitrile and ketone-aldehyde condensation products made in accordance with my invention, especially when, as stated previously, the molar ratio of aldehyde to ketone in the condensate which is cyanoethylated is not over 6:1 so that compatibility is assured. Such cyanoethylated ketone-aldehyde condensates, being resinous in nature and usually of a viscous oily consistency, are very easily incorporated with the resinous acrylonitrile-isobutylene copolymers to give a solution because of compatibility.

Plasticization of resinous acrylonitrile-isobutylene copolymers with the cyanoethylated ketone-aldehyde condensates of my invention effects a significant lowering in flow temperature which is often very advantageous in molding rigid objects since it makes possible the use of a lower molding temperature and shorter molding cycles resulting in greater production and lower cost.

*Examples of plasticization of acrylonitrile-isobutylene resinous copolymer*

The following table sets forth data showing the effect of plasticization of resinous acrylonitrile-isobutylene copolymers with varying amounts of a cyanoethylated acetone-formaldehyde condensate made in accordance with the present invention. The unplasticized acrylonitrile-isobutylene resin contained 77% combined acrylonitrile and 23% combined isobutylene and had the physical properties indicated in the left-hand column of figures. The other columns in the table show the use of 3, 6, 9 and 12% of the plasticizer, these percentages being by weight based on the weight of the plasticizer and resin. The cyanoethylated acetone-formaldehyde condensate was made in the manner described herein, the molar ratio of formaldehyde to acetone being 4.14:1 and the molar ratio of acrylonitrile to formaldehyde being 1.38:1. The plasticizer had a nitrogen content of 11.8% corresponding to a composition containing 44.7% of combined acrylonitrile. It will be seen that at a loading of about 9 per cent plasticizer there is a significant lowering of the flow temperature without undue impairment of other physical properties.

| Example | | VI | VII | VIII | IX |
|---|---|---|---|---|---|
| Acrylonitrile-Isobutylene Resinous Polymer | 100 | 97 | 94 | 91 | 88 |
| Plasticizer (Cyanoethylated Acetone-Formaldehyde Condensate) | 0 | 3 | 6 | 9 | 12 |
| Impact, ft.-lbs | 5.9 | 8.5 | 4.3 | 5.4 | 5.8 |
| Tensile, p. s. i | 9,800 | 8,900 | 9,400 | 9,600 | 7,500 |
| Heat Distortion Temp., °C | 71 | 68 | 72 | 70 | 69 |
| Flex. Strength, p. s. i | 16,000 | 16,000 | 14,000 | 15,000 | 14,000 |
| Rockwell Hardness | M-88 | M-88 | M-88 | M-85 | M-83 |
| Flow Temp., °C | 153 | 154 | 139 | 133 | 136 |

It has been found that high loadings of the acrylonitrile-isobutylene copolymer resin with the plasticizer of my invention, for example with 35% or more of the plasticizer, result in non-resilient stocks of generally poor physical properties. Accordingly I prefer to employ not over 20%, and still more preferably not over 10% of the plasticizer. With regard to a lower limit on the proportion of the plasticizer, I prefer to use at least 5% of the plasticizer.

From the foregoing description it will be seen that I have invented a highly useful material namely a cyanoethylated ketone-aldehyde condensation product which is simple and economical to prepare and a method of making the same together with the advantageous utilization of such a cyanoethylated material as a very effective plasticizer for acrylonitrile-isobutylene resinous copolymers.

All parts and percentages referred to herein are by weight.

Having thus described my invention, what I claim and desire to protect by Letters Patent is:

1. A new composition of matter comprising an acrylonitrile-isobutylene resinous copolymer made from monomeric components consisting of acrylonitrile and isobutylene and having a combined acrylonitrile content ranging from 65 to 85 per cent and a combined isobutylene content correspondingly ranging from 35 to 15 per cent, said copolymer being plasticized with the strong base-catalyzed reaction product of acrylonitrile with a clear, viscous, resinous alkaline-catalyzed condensation product of a ketone selected from the group consisting of saturated aliphatic ketones, saturated alicyclic ketones and aromatic ketones with a molar excess ranging up to six moles per mole of said ketone of a saturated aliphatic aldehyde, the molar ratio of the acrylonitrile used in making said reaction product to the aldehyde used in making said ketone-aldehyde condensation product ranging from 0.2:1 to 2.0:1, said reaction product being a clear homogeneous substantially water-insoluble, hydrocarbon-insoluble, non-volatile resinous material soluble in acetone and in chloroform but insoluble in carbon tetrachloride and being used in an amount ranging from 5 to 20% by weight based on the weight of said resinous copolymer and said reaction product.

2. The composition of claim 1 wherein said resinous ketone-aldehyde condensation product is a condensation product of acetone and formaldehyde.

3. The composition of claim 1 wherein said reaction product is present in an amount ranging from 5 to 10 per cent by weight based on the weight of said resinous copolymer and said reaction product.

4. The composition of claim 1 wherein said resinous ketone-aldehyde condensation product is a condensation product of acetone and formaldehyde and wherein said reaction product is present in an amount ranging from 5 to 10% by weight based on the weight of said resinous copolymer of said reaction product.

PLINY O. TAWNEY.

REFERENCES CITED

The following references are of record in the file of this patent:

UNITED STATES PATENTS

| Number | Name | Date |
|---|---|---|
| 2,237,325 | Balz | Apr. 8, 1941 |
| 2,327,771 | D'Alelio | Aug. 24, 1943 |
| 2,437,905 | Bruson | Mar. 16, 1948 |

OTHER REFERENCES

Roach et al.: pages 2651–2655, Journ. Amer. Chem. Soc., Nov. 1947.